(12) United States Patent  (10) Patent No.: US 9,147,159 B2
Hueter et al.  (45) Date of Patent: Sep. 29, 2015

(54) EXTRACTING PREDICTIVE SEGMENTS FROM SAMPLED DATA

(71) Applicant: CERTONA CORPORATION, San Diego, CA (US)

(72) Inventors: Geoffrey J. Hueter, San Diego, CA (US); Benjamin S. Farber, San Diego, CA (US)

(73) Assignee: CERTONA CORPORATION, San Diego, CA (US)

( * ) Notice: Subject to any disclaimer, the term of this patent is extended or adjusted under 35 U.S.C. 154(b) by 162 days.

(21) Appl. No.: 13/731,075

(22) Filed: Dec. 30, 2012

(65) Prior Publication Data

US 2013/0173524 A1 Jul. 4, 2013

Related U.S. Application Data

(60) Provisional application No. 61/581,700, filed on Dec. 30, 2011.

(51) Int. Cl.
  *G06N 5/02* (2006.01)
  *G06Q 10/04* (2012.01)
  *G06Q 30/02* (2012.01)

(52) U.S. Cl.
  CPC ............ *G06N 5/02* (2013.01); *G06Q 10/04* (2013.01); *G06Q 30/0201* (2013.01); *G06Q 30/0202* (2013.01)

(58) Field of Classification Search
  None
  See application file for complete search history.

(56) References Cited

U.S. PATENT DOCUMENTS

2008/0059281 A1* 3/2008 Tower et al. ............... 705/10

OTHER PUBLICATIONS

Deodhar, M. et al. "A framework for simultaneous co-clustering and learning from complex data." Proceedings of the 13th ACM SIGKDD international conference on Knowledge discovery and data mining. ACM, 2007.*
Park, S. et al. "Pairwise preference regression for cold-start recommendation." Proceedings of the third ACM conference on Recommender systems. ACM, 2009.*

* cited by examiner

*Primary Examiner* — Kakali Chaki
*Assistant Examiner* — Eric Nilsson
(74) *Attorney, Agent, or Firm* — Richard D. Clarke

(57) ABSTRACT

A system and method is disclosed which predicts the relative occurrence or presence of an event or item based on sample data consisting of samples which contain and samples which do not contain the event or item. The samples also consist of any number of descriptive attributes, which may be continuous variables, binary variables, or categorical variables. Given the sampled data, the system automatically creates statistically optimal segments from which a functional input/output relationship can be derived. These segments can either be used directly in the form of a lookup table or in some cases as input data to a secondary modeling system such as a linear regression module, a neural network, or other predictive system.

16 Claims, 10 Drawing Sheets

EXTRACTING PREDICTIVE SEGMENTS FROM SAMPLED DATA

FIELD OF THE INVENTION

The present invention relates to electronically targeting goods, services, content, advertising and other entities through the automated analysis of human behavior. Particularly, the invention relates to a means of creating predictive models in instances where the data is not presented as a simple functional relationship, but rather consists of samples of the occurrence or non-occurrence of an item of interest. The invention provides a means of creating and modeling such sampled data and creating a predictive system for recommending items of interest based on derived model segments. The system has application in personalization, behavioral targeting, Internet retailing, email segmentation and ad targeting, to name but a few applications.

BACKGROUND OF THE INVENTION

The present invention relates to predictive systems where the objective of the prediction is to model the probability that a certain event will occur given the parameters of population membership. Predictive models create value by taking available data samples and then applying some modeling technique to the data. Common modeling techniques include linear regression, logistic regression, neural networks, classification and regression tree (CART), and other techniques. A key requirement of each of these methods is that they require a set of functional relationships, or input-output pairs (Z, Y) as the starting point of the modeling process. The present invention addresses the circumstance where such input-output, pairs are not readily available and must be synthesized from distributions of samples that contain the event of interest and samples that do not contain the event of interest. Some examples of how this data requirement impacts other approaches are described below.

Many systems create models by using regression techniques. Whether linear, nonlinear, logistic, neural network or otherwise, all of these techniques require a well-defined set of functional pairs against which the model is fit. The present invention creates predictive segments as a pre-processing step to a regression modeling system or can be used as a fully functional predictive model by itself.

Clustering techniques, such as K-means or vector quantization, define groupings from which density functions can be defined, and hence can be used as means of generating input-output pair's to be used a pre-processing step to a predictive modeling process, such as a regression model. However, shortcomings of clustering techniques, which are addressed by the present invention are (i) clusters may not be predictive; that is, the clustering and differentiation of the input variable space may be different than the clustering and differentiation of the output variable space; (ii) the methods are computationally expensive; that is, they require a large number of iterative calculations to adjust the clusters to convergence (although only against the clustering criteria of the input space, not the output/prediction space); and (iii) determination of the number of clusters is difficult and may require trial and error, particularly given the non-guarantee of the predictability of the clusters; and (iv) the clustering is further complicated by the existence of two distributions, a normalizing distribution, and the differentiated distribution.

The present invention is similar to classification and regression trees (CART) in that it generates progressive levels of segmentation based on the significance of data. However, the significant drawback of CART is that CART assumes that the functional pairs already exist. The present invention can be applied to the circumstance where input-output pairs exist, but more importantly also applies in cases where the functional pairs are not defined as part of the data set. Also, the present invention has the benefit that it produces natural predictive segments of the input variables relative to the output variables.

SUMMARY OF THE INVENTION

In accordance with the present invention, a method and system is presented for recommending items of potential interest to users of a website, mobile application, or other application in which a user selects from a number of possible items. The recommendations are based on known information of the user, such as demographics, location, customer rewards, and past actions. The prediction of items of interest is based on comparing distributions of sample data, whereby one distribution of samples contains occurrences of the item of interest and the other distribution of samples does not contain occurrences of the item of interest. This invention is sometimes referred to in this patent by its commercial trademarked name, Resonance®.

An object of the invention is to provide a means of recommending objects to subjects based on demographic, geographic, behavioral or other characteristics of the subject.

Another object of die invention is to provide a means of recommending subjects to objects based on demographic, geographic, behavioral or other characteristics of the subject.

Another object of the invention is to automatically segment subjects according to their preference of certain items over other items based on sample transactions that contain and don't contain the item of interest.

Another object of the invention is to automatically provide variable segmentation commensurate with the predictive nature of the characteristics.

Another object of the invention is to be able to create predictive models from a variety of input characteristics, including continuous, binary, and enumerated characteristics.

Another object of the invention is to provide an efficient storage and runtime computation representation for the predictive segmentation models.

Another object of the invention is to provide an efficient single pass method for calculating segments during the training process.

Another object of the invention is to provide predictions even when certain model characteristics are not available for a given subject.

Another object of the invention is to combine attribute models of items of interest with other affinity models, such as based on browse behavior or individual ratings of items.

Another object of the invention is to filter recommended items from the attribute model with business rules.

Another object of the invention is to provide an interface to allow the business user who is setting up the system to assess the efficacy of the available input characteristics and to select which variables to use in the modeling and training process.

Another object of the invention is to create functional input-output pairs that can be used to train other models, such as linear regression, neural networks, or CART.

The present invention is a system and method for predicting subject responses to objects based on descriptive characteristics of the subject and the past responses of other subjects with matching characteristics. The process of matching subject segments to object response models produces a predicted response score that can be used to rank recommended content. The scores can be used as is or combined with other scoring models or business logic to render the final recommendation rank. The invention can be applied to a broad range of applications, including the retailing of single consumption items, such as non-recurring purchases or content views, where the previous purchase or view of an object cannot be used to predict additional purchases or views of the same object. The invention can also be used to predict subject responses to recurring purchases and to recommend new consumables.

The invention considers the interaction of subjects and objects. The subject is an active entity that initiates transactions. The subject consumes or experiences objects and provides feedback on the level of satisfaction with the object. The subject could be a single person or a corporate entity, such as a business. The object is a passive target of interaction by the subject. This could be a physical object, such as a consumer good, for example cars, MP3 player, or ice cream; media, such as music, movies, books, art, or plays; or even a person, as in the case of a job search or a matchmaking service. In the case of active entities, it is possible for the subject and object to reverse roles depending on the situation.

The invention provides a novel solution to the problem of how to identify objects, for example products, that will appeal to a particular subject, for example a person, where the large number of possible objects, including less desirable objects that are descriptively similar but aesthetically different or where some objects may appeal highly to a limited population of subjects while being undesirable to the broader population, makes it difficult for the subject to notice the objects that the subject wants simply by browsing the entire set of objects. This provides a breakthrough for target marketing and retail applications because it allows the consumer, solely by behavior, to "self-market" or "pull" those products which are of interest, rather than requiring that retailers "push" potentially unwanted products through advertising or other inefficient means.

The invention works by forming segments of subjects, for example consumers, and objects, such as goods or media, based on aesthetic evaluations of objects by subjects. The invention automatically generates segments based on the differential conversion of items within the segment relative to conversion of all items.

The invention also relates to the field of neural networks and optimization. Generally, neural networks take an input vector through a transfer function to produce an output. Neural network training methods are classified into supervised and unsupervised models. In supervised models the training method adapts the weights of the transfer function to minimize some function of the outputs, such as the mean squared error between the outputs produced by the transformation of the inputs and the expected outputs, which are known for a certain set of inputs commonly known as the training set. Once the weights have been trained, the network can be used to predict outputs for operational inputs. In unsupervised networks the data is clustered in some way that makes it useful for subsequent processing; however, the desired result, namely the closest matching template, is not known during training.

The proposed method is supervised insofar as the desired outputs are known as part of a training set; however, similar to unsupervised methods, the method is also self-organizing insofar as the inputs are not known; i.e., the method derives the input values using a known transfer function and known outputs.

Because of the large number of weights or adapted parameters of the system, which scales as the number of subjects and objects, a key aspect of the method is that the weights for each subject or object are decoupled from other subjects and objects when updated separately. This allows individual subjects and objects to be trained by different processing units, which allows the method to scale up to large numbers of subjects and objects, which may ultimately total millions or tens of millions or more.

A key improvement of the invention over predictive modeling systems is that it is able to synthesize the functional input output pairs that are required as a pre-condition for other modeling systems. This provides several advantages, including being able to create models from any type of sample data, support for any data type, working with correlated, input variables, not requiring expert knowledge or pre-analysis to identify variables or variable bins to create input output pairs.

DETAILED DESCRIPTION OF THE DRAWINGS

Figure 1:
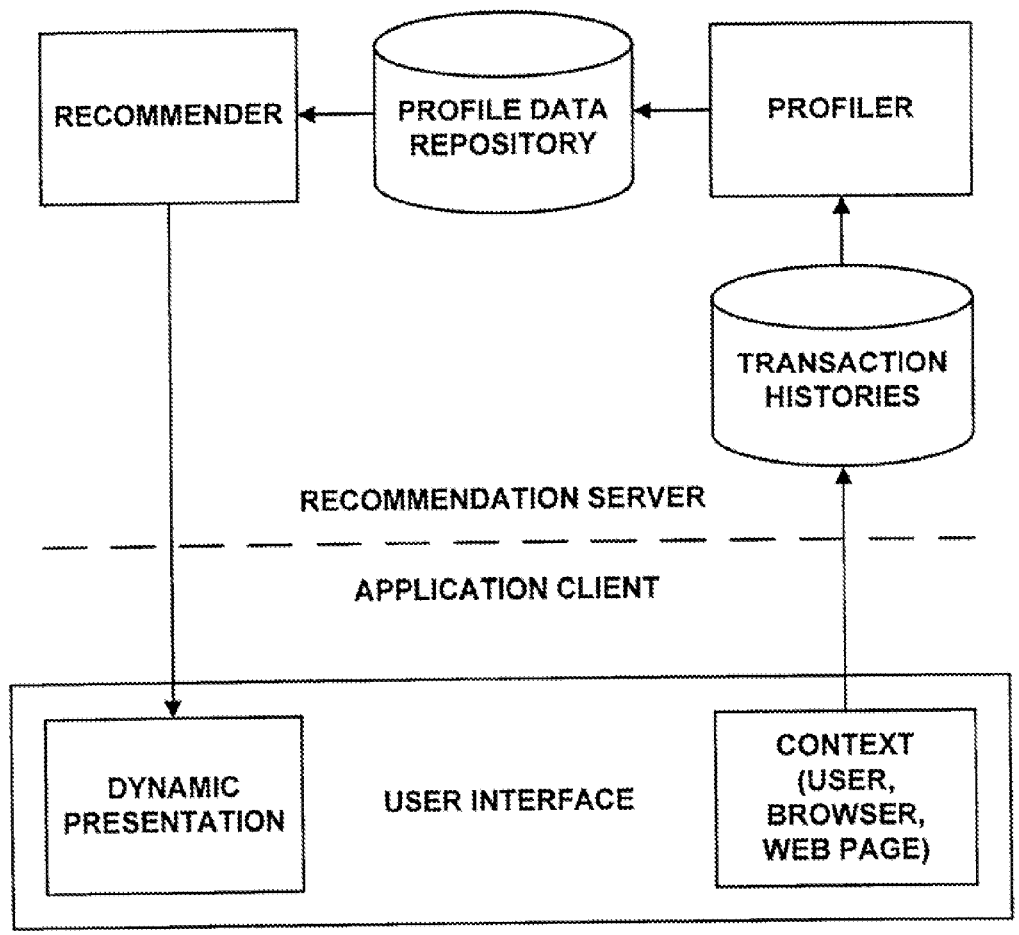
FIG. 1 shows the principal components of the system.

FIG. 1 shows the principal components of the system. As shown in the figure, there is an application client and a recommendation system. The end-user interface can be implemented using a variety of devices, including a personal computer, an in-store kiosk, a personal digital assistant (PDA), a mobile phone, a mobile tablet, a set top box, a wireless device or an ordinary phone with voice capability. The recommendation system is typically a computer or collection of computers within a network or across the Internet. As an alternative embodiment the recommendation request can be made through an intermediate server, which then renders the recommendations to the user interface.

A subject interacts with the user interface. The user interface makes a request to the recommendation system, which returns personalized content based on the context of the request, where the context of the request includes the identity of the subject, the specific type of system, such as desktop computer or mobile phone, the physical location of the subject, the specific page of the application being viewed, or any other known attributes that may be relevant to determining the interest or intent of the subject. In addition to requesting and displaying recommended content, the user interface submits information on the activity of the subject, including whether the subject completes a desired or targeted outcome, such as making a purchase, booking a hotel, completing a survey, accepting an offer, or any other conversion event for the site. The recommendation system stores all of the recommendation requests and subject outcomes, which are used to build subject profiles in accordance with the present invention.

Figure 2:
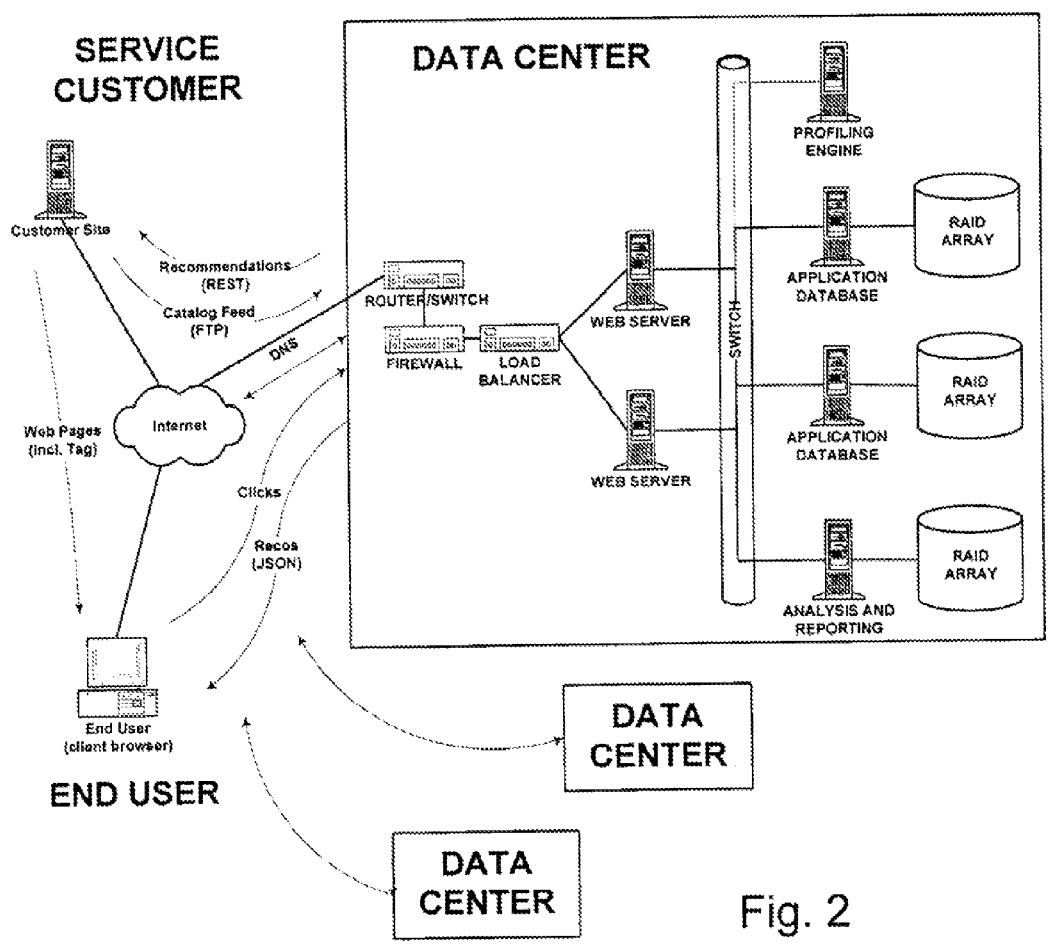
FIG. 2 shows the distribution of components across multiple computers on a network.

FIG. 2 shows an embodiment of the delivery of the system over the Internet. The end use application (Service Customer) is a website that is external to the system and that communicates with the system via web services from the customer website or directly from the customer website's end user's client browser. As shown, the system may be distributed across multiple computers on a network. This consists of one or more web servers (or web farm), which collect data and process content recommendation requests. The web servers pass data to one or more application databases via a message queuing system that allows the web servers to continue processing while the much slower database servers teed the data into permanent storage, such as non-volatile RAM, direct-attached RAID array, network attached storage (NAS), or storage area network (SAN). Additionally, a profiling engine retrieves affinity and other data from an application database and uses the data to generate the segmentation models, which are then stored back, into the application database. The predictive segmentation models, content metadata, and any additional business rules logic are also cached on the web servers for faster match generation during live operation.

In order to process an arbitrarily large number of visitors the web servers are multiplexed using a load balancer, which makes a collection of web servers appear to the Internet as a single server. Also, when a web server becomes unavailable or out of service for any reason, the load balancer automatically transfers traffic to another server. This provides a high level of fault tolerance for the system. In order to provide additional service availability the database and web servers can be replicated to other data centers, through geographic load balancing. Note that in this embodiment the service has been distributed over multiple servers. In an alternative embodiment all of the functions of the service could be put onto a single or smaller set of servers without a substantive change in the overall functionality of the service. This embodiment also supports multiple Service Customers making simultaneous requests to the web services by allocating different requests to different subsets of servers in the server farm and by creating a separate database for each Service Customer.

Figure 3:
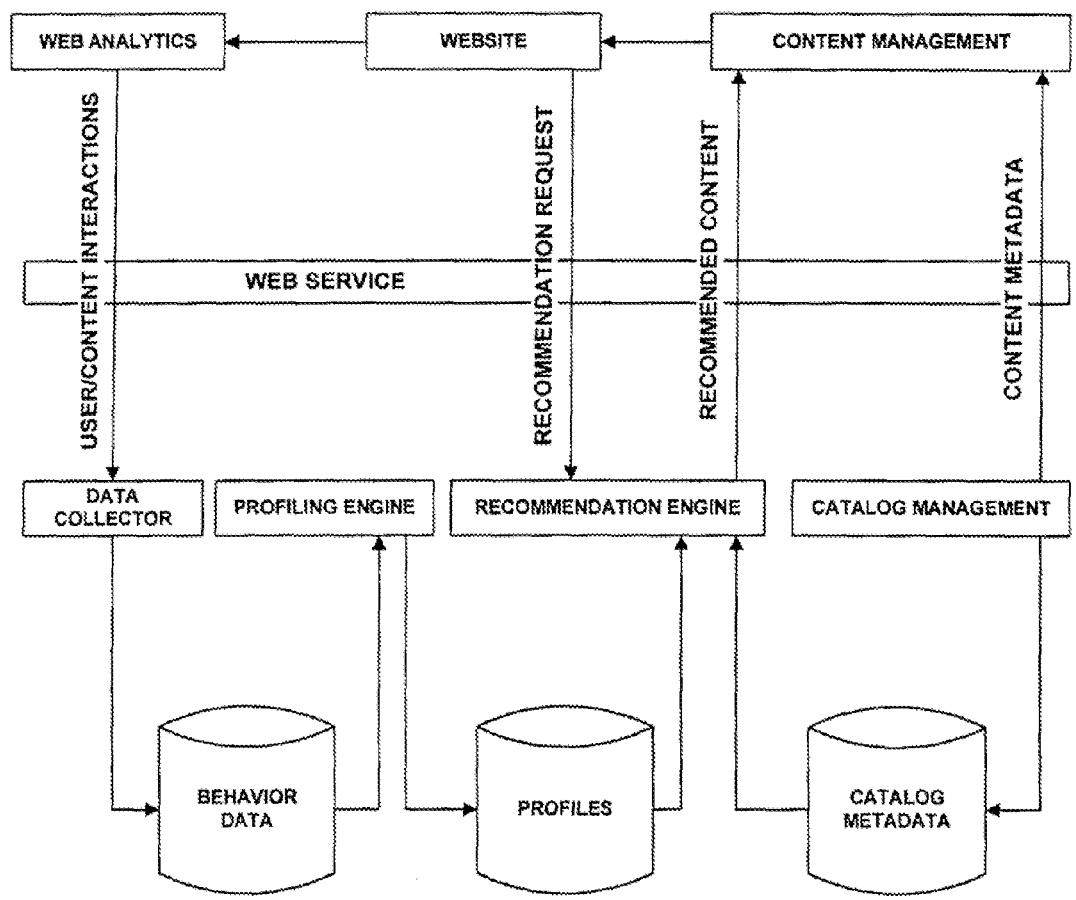
FIG. 3 shows an embodiment of the system using web services on a distributed network.

FIG. 3 shows an embodiment of the system using web services on a distributed network. The website, content management, and web analytics modules are external, to the system and communicate with the data collector, profiling engine, recommendation engine and catalog management modules via web services (REST or SOAP), such as using XML or JSONP. The website requests information from the content management module and displays it on the browser. The browser generates user context and behavior data via the web analytics module. This can be done on the browser itself using JavaScript or on the web server using web logging or packet sniffing, or using other data transfer mechanisms as appropriate to the service customer. Regardless of how this is done, the web analytics submits data via a web service call to the data collector. To display customized content the website requests information from the recommendation engine. The output of the recommendation engine is fed through the content management module to get the display attributes of the recommended content and then displayed on the website.

The content management module not only generates content for the website, it also feeds content information (metadata) to the catalog management module, which stores both information necessary to display content and descriptive attributes that may be applied to filter targeted content according to website-defined business rules or objectives. When a request is made to the recommendation engine for targeted content, the recommendation engine combines the subject profiles with the catalog metadata to find, the optimal content subject to any business rules, or other restrictions, put on the results.

Figure 4:
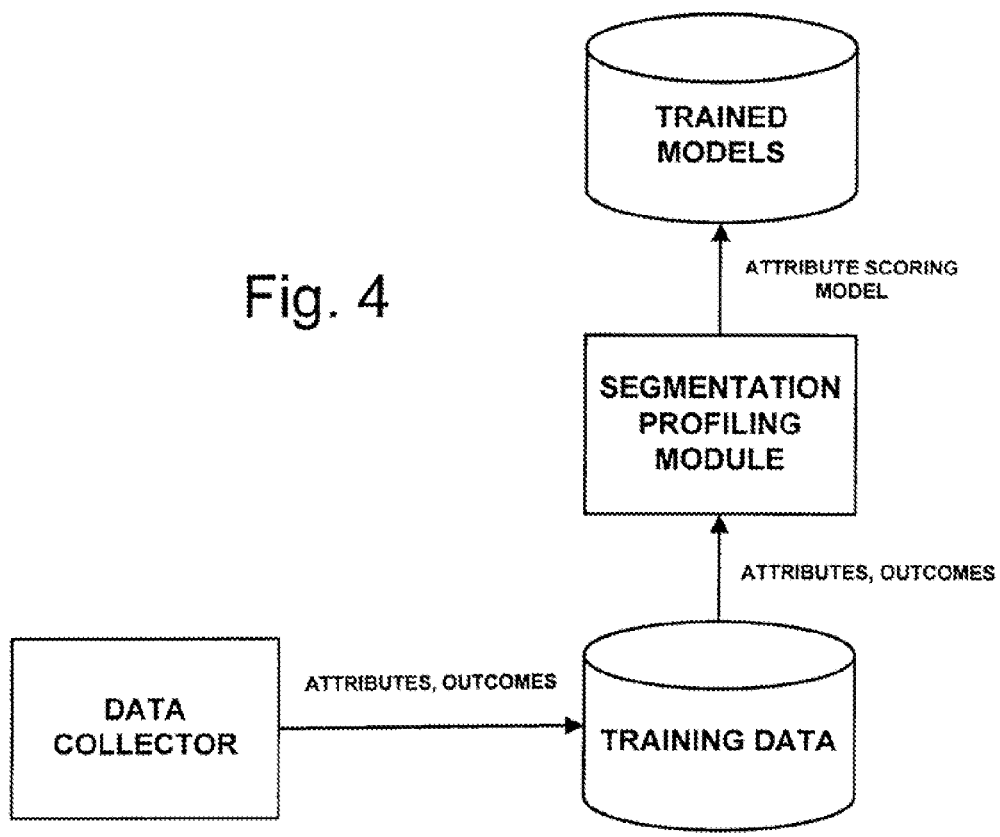
FIG. 4 shows the components of the modeling system.

FIG. 4 shows the components of the modeling system. The data collector feeds attribute and outcome data to the system, which stores it in the system database. The outcomes include the conversion events for any items that the service customer would like to target to its users. The profiling module then builds the predictive segments for each item based on the attributes and outcomes of each user visit. The resulting models are then stored in the model database. During operation, the models are either accessed directly from the model database or cached into the web servers for fester processing and higher system throughput.

Figure 5:
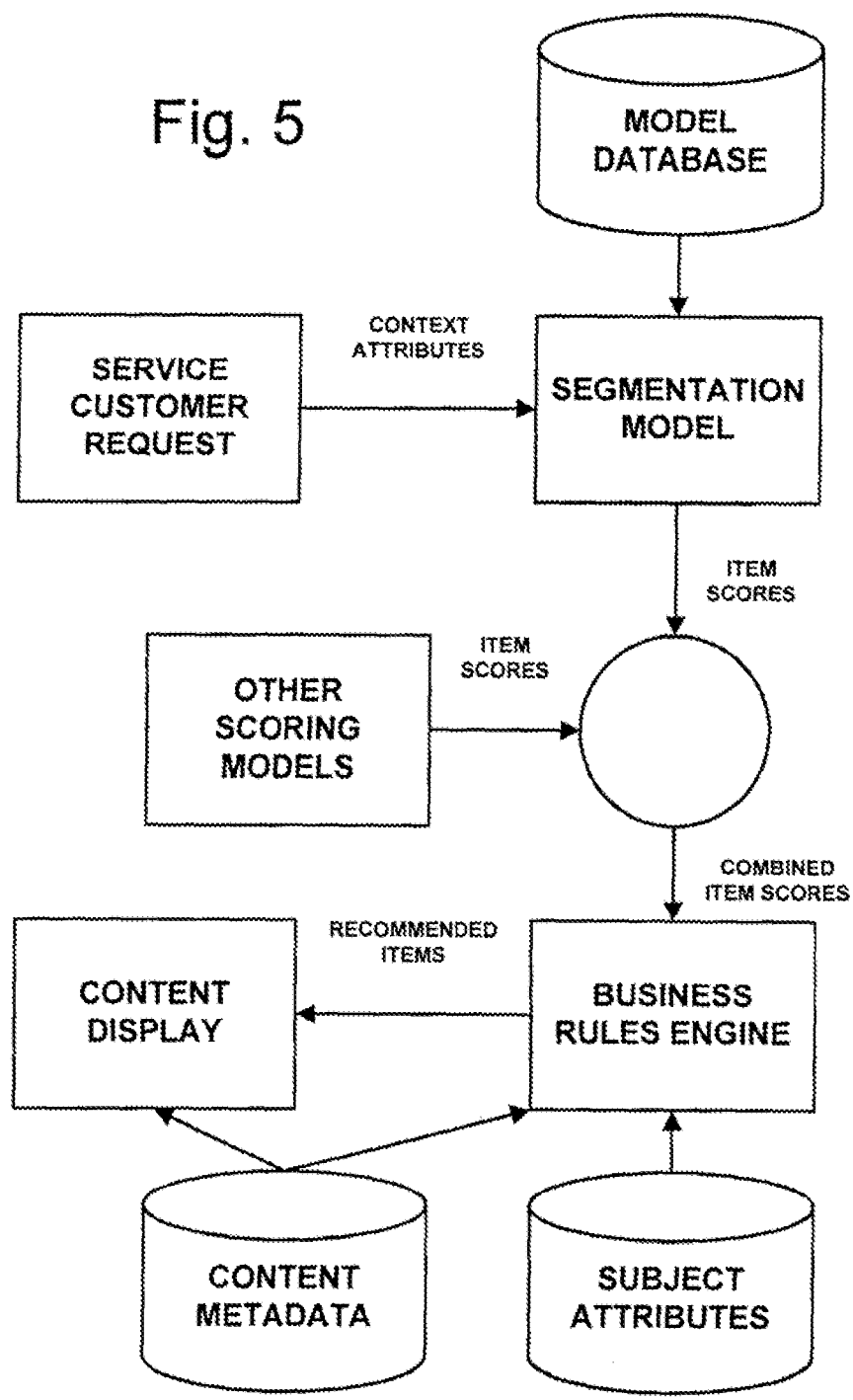
FIG. 5 shows the use of the invention in a system that select items to recommend to a specific subject.

FIG. 5 shows the use of the invention in a system that selects items to recommend to a specific subject. The application using the recommendation service makes a Service Customer Request to the system. The request includes the attributes that are available and relevant to the request, which include but axe not limited to information about the page being viewed, including category, search result, or specific item being viewed; information about the visitor, including age, gender, income, number of children, marital status, income, lifetime value, or other attributes; and information about the nature of the subject's visit to the site, including location (latitude, longitude, altitude, state, country, city, postal code, or other location information), time-of-day (adjusted for location), type of device, type of browser, connection speed, referring URL, search engine keyword or other attributes of the visit. The context attributes are processed through previously trained segmentation models according to FIG. 4, which stores the models in the model database.

The segmentation models return a score for each possible recommendable item, whereby the scores indicate the relative probabilities of the subject, transacting the items. The items' segmentation scores may be combined with the scores from other recommendation modules, such as based on behavioral affinity models, collaborative filters, or other alternative models. The items are ranked by their combined scores and then filtered according to any specified business rules, which may include rules for pricing, category matching, inventory, or other merchandising goals. Business rules may be based on any attributes of the context, including subject attributes and content metadata. Finally, the resulting recommendations are formatted for display, including images, descriptions, destination links, purchase information, and other display attributes.

Figure 6:
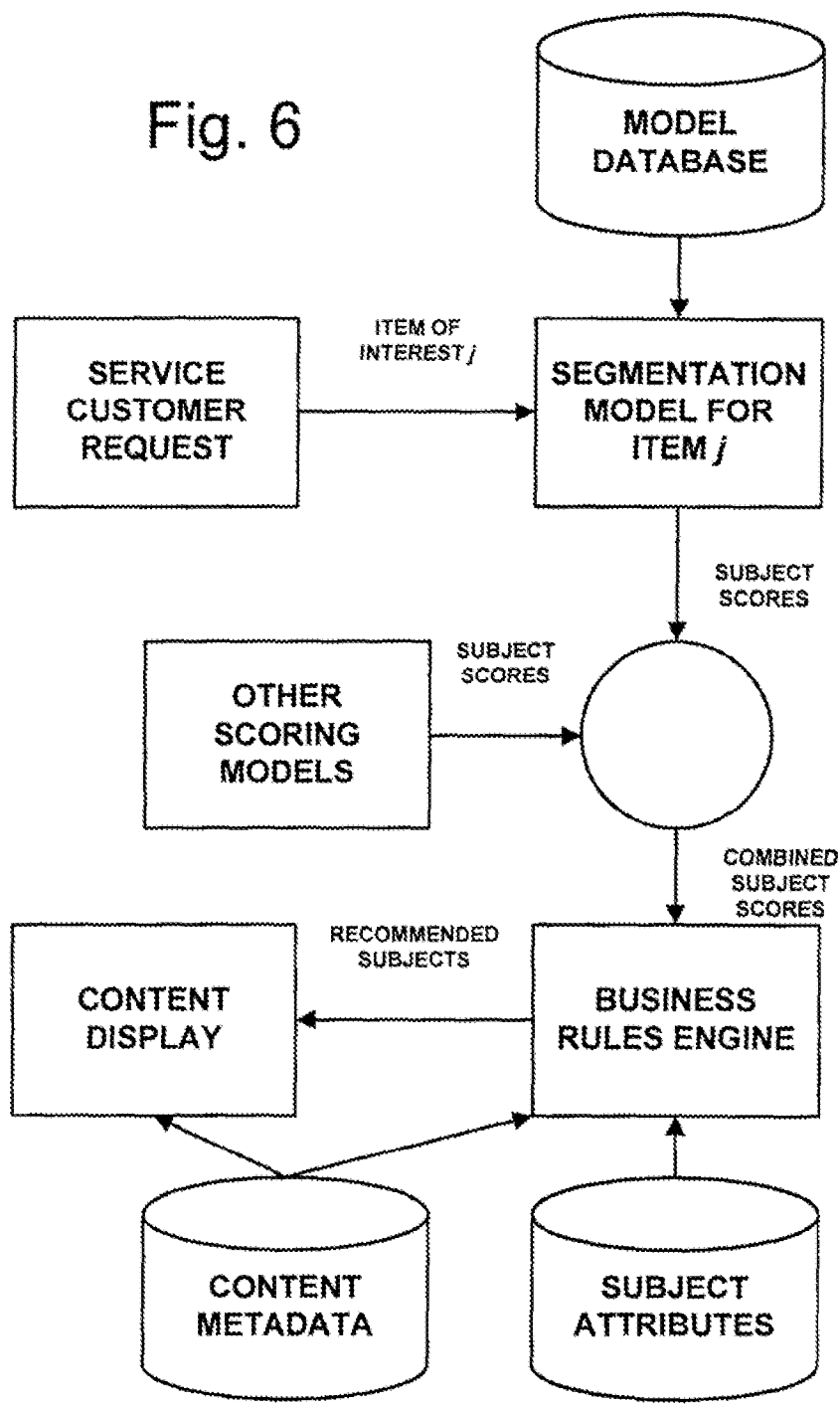
FIG. 6 shows the use of the invention in a system that, selects subjects to whom to recommend a specific item.

FIG. 6 shows the use of the invention in a system that selects subjects to whom to recommend a specific item. The application using the recommendation service makes a Service Customer Request to the system. The request includes the attributes that are available and relevant to the request, which include but are not limited to information about the page being viewed, including category, search result, or specific item being viewed; information about the visitor, including age, gender, income, number of children, marital status, income, lifetime value, or other attributes; and information about the nature of the subject's visit to the site, including location (latitude, longitude, altitude, state, country, city, postal code, or other location information), time-of-day (adjusted for location), type of device, type of browser, connection speed, referring URL, search engine keyword or other attributes of the visit. The context attributes are processed through the previously trained segmentation model for the item of interest according to FIG. 4, which is stored in the model database.

The segmentation model returns a score for each possible available subject, whereby the scores indicate the relative probabilities of the subjects transacting the item. The subjects' segmentation scores may be combined with the scores from other recommendation modules, such as based on behavioral affinity models, collaborative filters, or other alternative models. The subject are ranked by their combined scores and then filtered according to any specified business rules, which may include rules for pricing, category matching, inventory, or other merchandising goals. Business rules may be based on any attributes of the context, including subject attributes and content metadata. Finally, the resulting subjects are targeted and presented with the item of interest through email, mobile text, advertisement, direct mail, or other targeted medium. The recommendations are formatted for display, including images, descriptions, destination links, purchase information, and other display attributes using the catalog metadata or other attribute repository.

Figure 7:
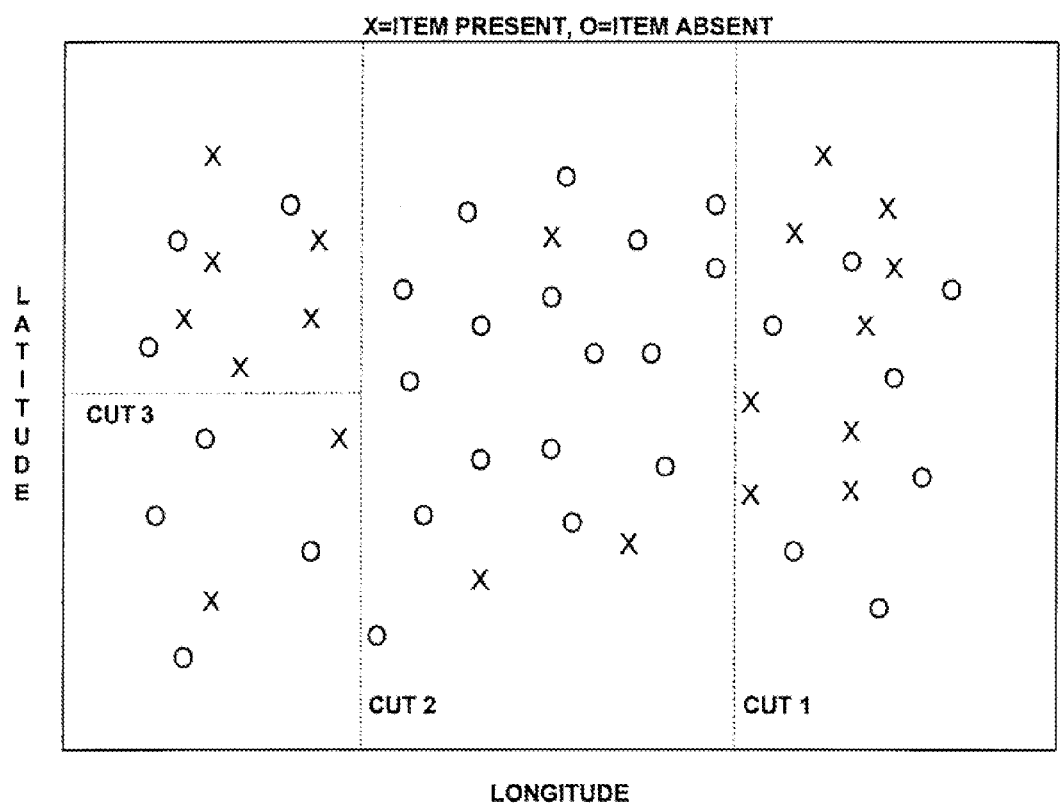
FIG. 7 shows an example of the use of the invention with a data set of two variables.

FIG. 7 shows an example of the use of the invention with a data, set of two variables. The invention can be applied to an arbitrary number and type of input segmentation variables, as well as any definition of conversion. For concreteness, the example in FIG. 7 considers the case of a model of predicting a subject's disposition to purchase an item based on the subject's geographic location, specifically current latitude and longitude. Specifically in this embodiment, we want to predict which customers are more likely to purchase a particular product, whereby the input data set is the purchase histories of the customer population and the population is identified by demographic, geographic, or temporal variables, such as time of day.

The invention applies to the case where the model training data consists of samples where an item of interest is present in some samples and absent from others. More specifically, the invention considers two distributions against a set of segmentation attributes that are to be used as the input variables to a predictive model:

1. The distribution of occurrences $D_{j,present}$ where the item of interest j is present in the transaction. These are marked with an "X" in FIG. 7.
2. The distribution of occurrences $D_{j,absent}$ where the transactions include items other than j. These are marked with an "O" in FIG. 7.

In this case the underlying functional relationship is the relative probability of a subject with attributes Z making a purchase of the specific item being model vs. purchasing any other item. This relationship can be quantified as $$Y_j(Z) = D_{j,present}(Z) / D_{j,absent}(Z),$$

where $D_{j,present}(Z)$ is the probability of a consumer with attributes Z will purchase the item of interest j, and $D_{j,absent}(Z)$ is probability of a consumer with attributes Z making any other kind of purchase without the item of interest j. It is a key innovation of the invention, that it synthesizes the input output pairs (Z, Y), whereas other predictive modeling systems require that this data be already present as a necessary requirement for applying those systems.

Figure 8:
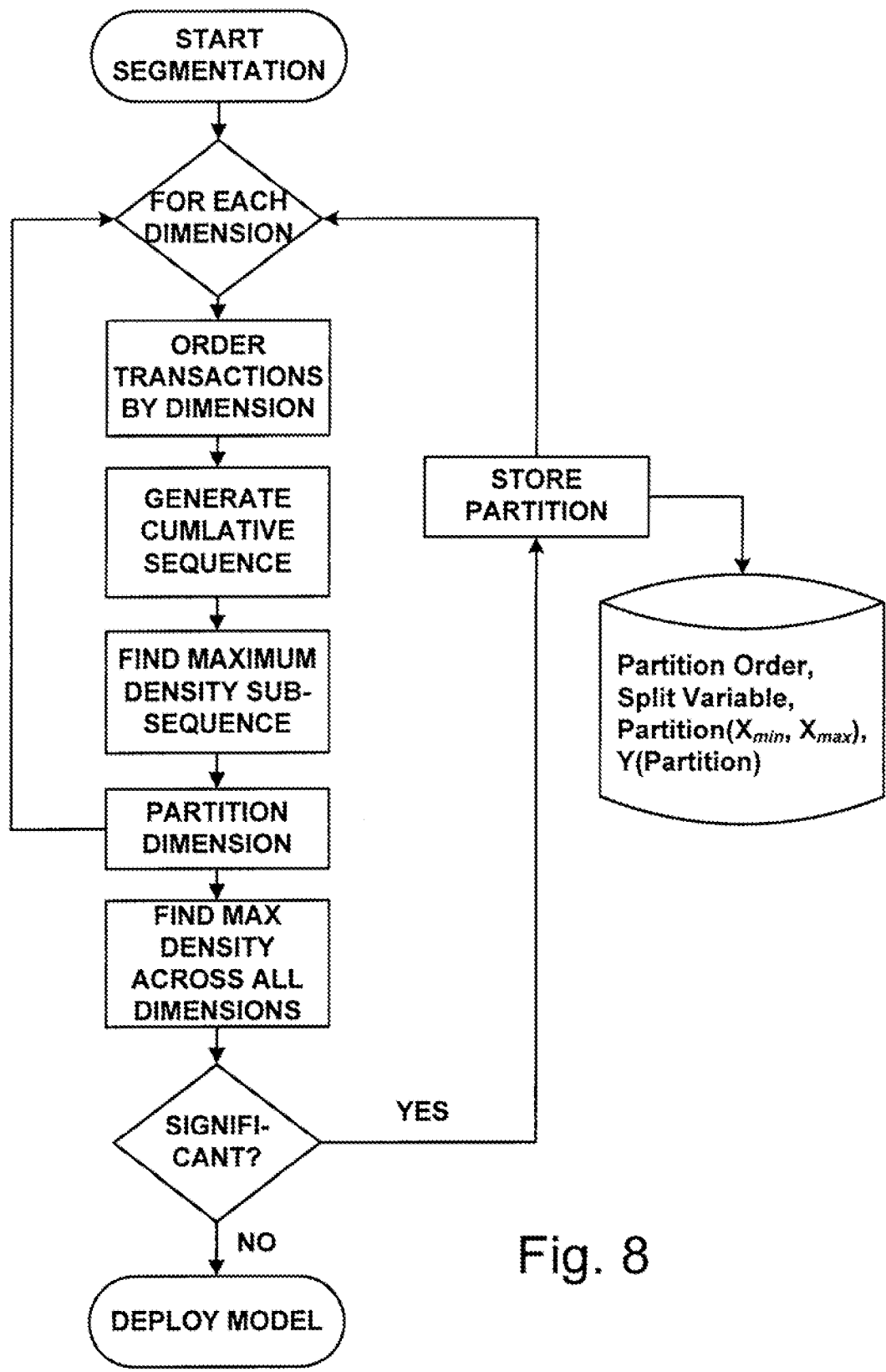
FIG. 8 describes the processing flow for creating predictive segments.

FIG. 8 describes the processing flow for creating predictive segments. The segments are created by progressively partitioning the samples into segments. A partitioning step is as follows:

For each segmentation attribute, analyze the distribution of samples as follows:
1. Order the transactions (occurrences) by dimension. Treat, each dimension one at a time and independently.
2. Create a cumulative sequence by adding P to the previous value when the next transaction contains the item of interest and subtract A when item is not present, in the preferred embodiment, $P=1/N_P$, where $N_P$ is the total number of transactions containing the item of interest and $A=1/N_A$, where $N_A$ is the total number of transactions not containing the item of interest. The total number of transactions is $N_{total} = N_P + N_A$. Other weightings of present and non-present information, may also be used, but this configuration has the advantages of always summing to zero and having generally consistent visual presentation for the review module with a maximum range of 1. For cases where invention is applied to purchase models, alternative approaches are to weight by revenue or units.
3. Determine the sequence of maximum relative probability of the item, as shown in FIG. 8.
4. The max and the min correspond to the candidate partition points of the dimension.
5. Partition the dimension using the point furthest from the edge of the domain of the dimension in sample order. This allows the greatest sensitivity and selectivity later in the partitioning process and avoids artificially small cells early on in the process.
6. Calculate the density factor $d=r/s$, whereby r=(number of items of interest in peak sequence) and s=(number of all items in peak sequence). Note that d is number between 0 and 1.
7. The density factor is considered significant if $R=(r-r_{avg})/\sqrt{r} > T$, where $r_{avg}=s \cdot N_P/N_{total}$ and for example T=2.

The above process is repeated for all dimensions and cells. To determine which dimension "wins," only consider those dimensions for which the density factor is significant as defined above. If no dimension meets the significance criterion, then terminate the partitioning process. Otherwise, pick; the dimension for which the density factor significance R, as defined above, is highest. Split the cell and repeat the above process until there are no more significant partitions. Referring back to the example in FIG. 7, the above process produced three cut points from, which resulted in 4 model segments.

The partitioning process is efficient because the results of each step can be bookmarked and the densities only need to be recalculated for the two partitioned cells.

Once done with the partitioning, the functional pairs can be defined as $$Y(Z) = (\text{number of items in the bin})/(\text{all items in the bin}),$$

where Z is the center of the bin.

From an operational standpoint, the results can be stored and accessed directly using the partitioning table as a lookup table. Alternatively, an interpolating model can be built from the samples using any typical modeling technique, such as linear regression or neural networks.

The present invention can also be used to predict response even when some of the segmentation variables are not available to a certain request, such as because it requires the subject to provide the data and not every user complies or because data may come from different sources and not all sources may be able to provide all of the attributes used in the segmentation. The invention handles this case by traversing through the segments of a given item's models in the order that they were created (defined as the Partition Order in FIG. 8). This provides the maximum resolution and sensitivity allowed by the missing data.

Figure 9:
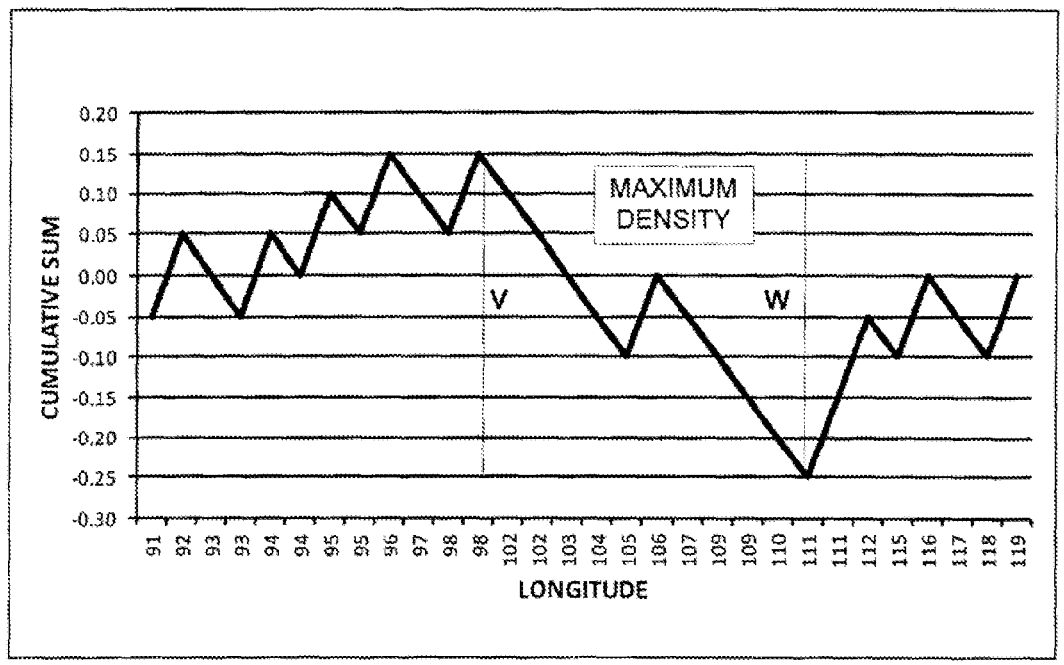
FIG. 9 shows an example of ordering the data for analysis.

FIG. 9 shows an example of ordering the data for analysis. According to the description in FIG. 8 and the distribution of data in FIG. 7, the graph increases where there are transactions with the item of interest present and decreases where there are transactions without the item of interest present. The region of maximum density is defined as the range between the maximum of the graph and the minimum of the graph, (If a maximum or minimum is repeated, then take the point closets to the other extreme). Finally, the cut point would be the value closest to the center, that is, the point that is the most samples away from the boundary of the distribution, in this case V as shown on FIG. 9.

Figure 10:
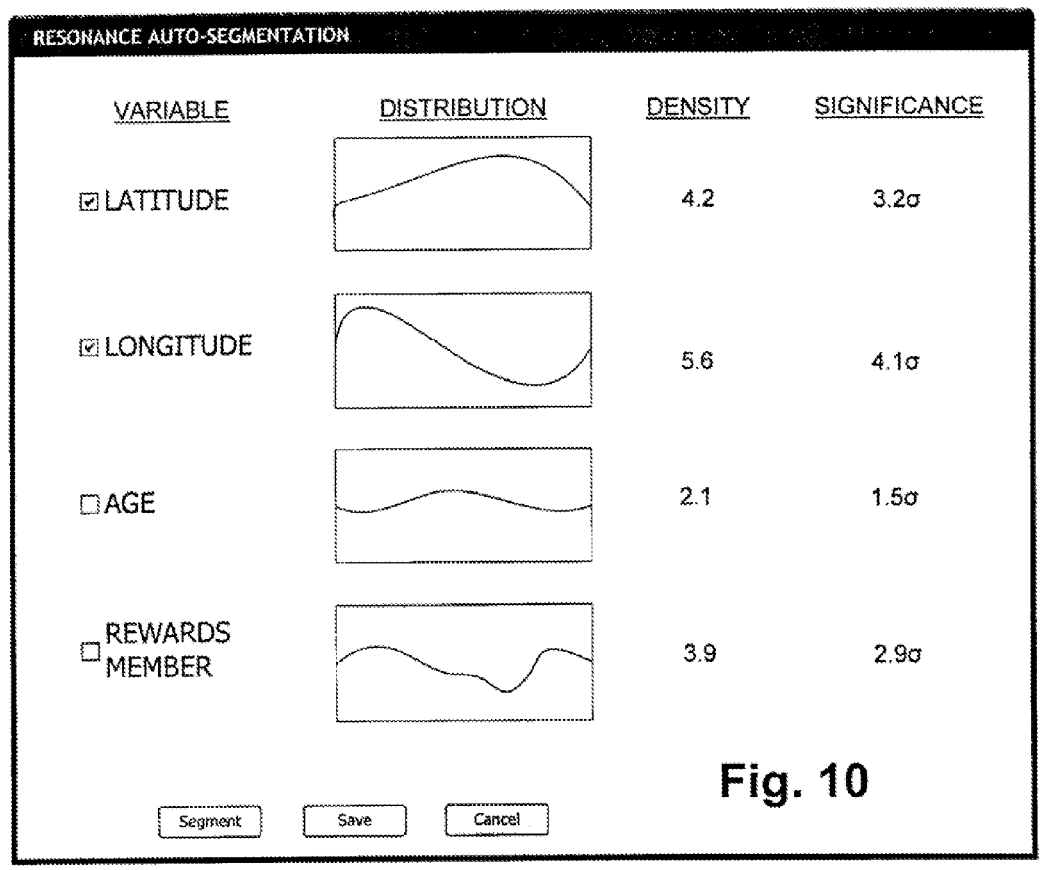
FIG. 10 shows the parameter selection process based on the first level of candidate segments.

FIG. 10 shows the parameter selection process based on the first level of candidate segments. This user interface would allow an operator, for example a merchandiser or marketing manager, to get an idea of which variables are predictive of subjects' intents to transact. The operator would then select which variables to include in the segmentation model. In general this step is not required and the invention will work without it, but there may be reasons not clear from the training data set to exclude certain variables from the model, such as because it is known to the operator that a particular variable may not be readily available in the operational system or that one variable is redundant to another.

Another aspect of the invention is that it optimizes the segments boundaries to the specific objectives of the model rather than simply reproducing the underlying density functions, which may or may not track the predictive nature of the attributes.

Another aspect of the invention is that it provides a linear training process vs. iterative processing for clustering and density estimation techniques.

Another aspect of the invention is that, it provides an efficient partitioning and recursively adds detail to the level supported by the statistics and selectivity of the data.

Another aspect of the invention is that it ignores missing inputs by falling back to previous cut points.

Another aspect of the invention is that it supports a simple runtime computation via a lookup table.

Another aspect of the invention is that it can be used as a front-end data generator for regression models.

Another aspect of the invention is that it doesn't require orthogonal (uncorrelated) variables.

Another aspect of the invention is that it naturally handles continuous, binary, and categorical data, whereas other modeling techniques just handle continuous variables.

Another aspect of the invention is that it can be applied even when data is sparse or abnormally distributed. Unlike other methods it only relies on the order of the data rather than the absolute positioning to estimate density functions.

The foregoing description of a preferred embodiment has been presented by way of example only, and should not be read in a limiting sense. The scope of the present invention is defined only by the following claims.

In the claims reference characters used to designate claim steps are provided for convenience of description only, and are not intended to imply a particular order for performing the steps.

What is claimed is:

1. A computer implemented web-based predictive modeling method to extract predictive segments from sampled data used for predicting subject response, comprising the steps of:
    providing segmentation attributes and sampled data; and analyzing the distribution of sampled data;
    wherein said analysis of the distribution of sampled data comprises the steps of:
        ordering the transactions and occurrences by dimension and treating each dimension one at a time and independently;
        creating a cumulative sequence by adding P to the previous value when the next transaction contains the item of interest and subtracting A when the item is not present, such that $P=1/N_P$, where $N_P$ is the total number of transactions containing the item of interest, and $A=1/N_A$, where $N_A$ is the total number of transactions not containing the item of interest, and where the total number of transactions is $N_{total}=N_P+N_A$;
        determining the sequence of maximum relative probability of the item wherein the max and the min correspond to the candidate partition points of the dimension;
        partitioning the dimension using the point furthest from the edge of the domain of the dimension in sample order; and
        calculating the density factor d=r/s, whereby r=(number of items of interest in peak sequence) and s=(number of all items in peak sequence) and d is a number between 0 and 1;
    whereby the density factor is considered significant if $R=(r-r_{avg})/\sqrt{r} \geq T$, where $r_{avg}=s \cdot N_P/N_{total}$ and T is a predetermined user specified significance threshold.

2. The computer implemented web-based predictive modeling method to extract predictive segments from sampled data used for predicting subject response, according to claim 1, wherein during said partitioning process the results of each step are bookmarked and said densities need only be recalculated for two partitioned cells resulting in functional pairs.

3. The computer implemented web-based predictive modeling method to extract predictive segments from sampled data used for predicting subject response, according to claim 2, wherein said functional pairs are defined as:

$$Y(Z)=(\text{number of items in the bin})/(\text{all items in the bin}),$$

where Z is the center of the bin.

4. The computer implemented web-based predictive modeling method to extract predictive segments from sampled data used for predicting subject response, according to claim 2; wherein said distribution of sampled data is analyzed and the results of said analysis are stored and accessed directly using a partitioning table as a lookup table.

5. The computer implemented web-based predictive modeling method to extract predictive segments from sampled data used for predicting subject response, according to claim 1, further comprising the steps of:
    providing an application client having an end-user interface and a recommendation server having a profiler, comprising a service system to collect sample transactions both with and without an item of interest, along with associated subject profiles represented as attribute values;
    providing a data collector that feeds outcome and attribute data to a service system;
    having said data collector feed outcome and attribute data to the system, and storing said data in a system database wherein the outcomes include the conversion events for any items that a service customer would like to target to its users;
    providing a profiling module which then builds the predictive segments for each item based on the outcomes and attributes of each user transaction; and
    storing the resulting models in a model database;
    whereby during operation the models are either accessed directly from the model database or cached into web servers for faster processing and higher system throughput.

6. The computer implemented web-based predictive modeling method to extract predictive segments from sampled data used for predicting subject response, according to claim 5, wherein said service system is used to recommend a specific item to a subject, comprising the steps of:
provided an application using the recommendation service;
having said application request makes a service customer request to the system, wherein said request includes attribute data;
whereby said attribute data includes the attributes that are available and relevant to the request, which include information about the page being viewed, including category, search result, or specific item being viewed; information about the subject, including age, gender, income, number of children, marital status, income, or lifetime value; information about the subject's location, including location, latitude, longitude, altitude, state, country, city, or postal code; and information about the nature of the subject's visit to the site, including time-of-day adjusted for location, type of device, type of browser, connection speed, referring URL, or search engine keyword.

7. The computer implemented web-based predictive modeling, method to extract predictive segments from sampled data used for predicting subject response, according to claim 5, including providing previously trained segmentation models wherein said context attributes are processed through said previously trained segmentation models for the item of interest, which is stored in the model database as model training data.

8. The computer implemented web-based predictive modeling method to extract predictive segments from sampled data used for predicting subject response, according to claim 7, further including model training data consisting of a set of samples wherein an item of interest is present in a subset of said samples and an item of interest is absent from a subset of said samples and the system considers two distributions against a set of segmentation attributes that are to be used as the input variables to a predictive model as:
the distribution of occurrences $D_{j,present}$ where the item of interest j is present in the transaction; and
the distribution of occurrences $D_{j,absent}$ where the transactions include items other than j.

9. The computer implemented web-based predictive modeling method to extract predictive segments from sampled data used for predicting subject response, according to claim 8, wherein a functional relationship between a subject with attributes Z and an item j is determined by the relative probability of said subject with attributes Z making a purchase of said item j versus purchasing any other item; and further wherein said functional relationship can be quantified as:

$Y_j(Z)=D_{j,present}(Z)/D_{j,absent}(Z)$, where $D_{j,present}(Z)$ is the probability of a consumer with attributes Z will purchase the item of interest j, and $D_{j,absent}(Z)$ is probability of a consumer with attributes Z making any other kind of purchase without the item of interest j.

10. The computer implemented web-based predictive modeling, method to extract predictive segments from sampled data used for predicting subject response, according to claim 5; wherein said segmentation models return a score for each possible recommendable item, whereby the scores indicate the relative probabilities of the subject transacting the items.

11. The computer implemented web-based predictive modeling, method to extract predictive segments from sampled data used for predicting subject response, according to claim 5, further including combining the predictive segment scores with the scores from other affinity or behavioral models and then re-ranking the results by the combined scores.

12. The computer implemented web-based predictive modeling method to extract predictive segments from sampled data used for predicting subject response, according to claim 5, further including filtering the results with business rules, wherein said business rules are based on attributes of the context including subject attributes and content metadata.

13. The computer implemented web-based predictive modeling method to extract predictive segments from sampled data used for predicting subject response, according to claim 1, wherein said end-user interface is implemented using a personal computer, an in-store kiosk, a personal digital assistant (PDA), a mobile phone, a mobile tablet, a set top box, a wireless device or an ordinary phone with voice capability.

14. The computer implemented web-based predictive modeling method to extract predictive segments from sampled data used for predicting subject response, according to claim 1, wherein said end use external application includes a customer service website that is external to the system and that communicates with the system via web services from the customer website or directly from the customer website's end user's client browser.

15. The computer implemented web-based predictive modeling method to extract predictive segments from sampled data used for predicting subject response, according to claim 1, further including using web services on a distributed network wherein said web services on a distributed network include a website, content management, and web analytics modules which are external to the system and communicate with a data collector, a profiling engine, a recommendation engine and one or more catalog management modules via conventional web services.

16. The computer implemented web-based predictive modeling method to extract predictive segments from sampled data used for predicting subject response, according to claim 1, wherein said segmentation attributes includes attributes that are continuous, Boolean, or categorical.

* * * * *